United States Patent [19]

Ambrosius et al.

[11] Patent Number: 4,867,794

[45] Date of Patent: Sep. 19, 1989

[54] PROCESS FOR PREPARING RUTILE-COATED MICA PIGMENTS

[75] Inventors: Klaus Ambrosius, Frankfurt am Main; August Knapp; Helmut Plamper, both of Dieburg; Reiner Esselborn, Darmstadt, all of Fed. Rep. of Germany

[73] Assignee: Merck Patent Gesellschaft Mit Beschränkter Haftung, Darmstadt, Fed. Rep. of Germany

[21] Appl. No.: 131,605

[22] Filed: Dec. 11, 1987

[30] Foreign Application Priority Data

Dec. 13, 1986 [DE] Fed. Rep. of Germany ....... 3642647

[51] Int. Cl.$^4$ .................... C04B 14/20; C07C 3/06
[52] U.S. Cl. .................................... 106/417; 166/415; 166/441

[58] Field of Search ................. 106/291, 300, 308 B, 106/309, 415, 417, 441, 436

[56] References Cited

U.S. PATENT DOCUMENTS

| | | |
|---|---|---|
| 3,553,001 | 1/1971 | Kohlschutter et al. |
| 4,038,099 | 7/1977 | DeLuca, Jr. et al. ............... 106/291 |
| 4,040,859 | 8/1977 | Esselborn et al. ................... 106/291 |
| 4,086,100 | 4/1978 | Esselborn et al. ................... 106/291 |

*Primary Examiner*—Paul Lieberman
*Assistant Examiner*—Christine A. Skane
*Attorney, Agent, or Firm*—Millen, White & Zelano

[57] ABSTRACT

In mica/titanium dioxide pigments reliable rutilization is obtained with small amounts of tin by precipitating tin dioxide directly on the mica and completing this precipitation before the precipitation of titanium dioxide is started.

9 Claims, No Drawings

PROCESS FOR PREPARING RUTILE-COATED MICA PIGMENTS

BACKGROUND OF THE INVENTION

The invention relates to a process for preparing pearl luster pigments based on metal oxide coated mica flakes wherein, to coat with titanium dioxide in the rutile form, not only $TiO_2$ but also $SnO_2$ is precipitated onto the mica flakes in aqueous suspension and the pigment is then washed, dried and calcined.

Processes for preparing rutile-containing mica pigments are known not only from German Patent Specifications Nos. 2,214,545 and 2,522,572 (equivalent to U.S. Pat. No. 4,086,100) but also from U.S. Pat. No. 4,038,099.

In the process of DE Patent No. 2,522,572, first a very thin titanium dioxide layer is precipitated onto mica flakes followed alternatingly by at least one $SnO_2$ and $TiO_2$ layer, thicker layers being prepared by alternatingly precipitating a plurality of $SnO_2$ and $TiO_2$ layers. These $SnO_2$ and $TiO_2$ layers are in each case prepared by slowly adding to the mica suspension, together with a base for keeping the pH constant, the tin salt solution with or without an oxidizing agent in the one case and the titanium salt solution in the other. In this way the precipitation can be very simply continued until the metal oxides are present in the desired layer thickness and consequently the pigment has the desired interference color. Customary washing, drying and calcining produces very brilliant pigments. However, a disadvantage is the very complicated process, in particular in the case of relatively thick layers. In addition, it requires relatively high tin dioxide contents, which in general range from about 5 to 7% by weight, based on the completed pigment.

It is true that the process of DE Patent 2,214,545 and U.S. Pat. No. 4,038,099 can be carried out with smaller amounts of tin, but other serious disadvantages remain. In this process, the mica suspension has added to it the solution of a tin salt and then a strong acid, and a portion of the tin precipitates as water-containing tin oxide on the mica flakes. Thereafter a titanyl sulfate solution is added, and the suspension is heated to a boil; as a result of hydrolysis and precipitation, titanium dioxide deposits on the mica flakes and, in the course of this process, the remaining tin is incorporated as a tin oxide in the titanium dioxide layer as it forms.

In this hydrolysis process, the thickness of the metal oxide layer and hence the interference color of the pigment is determined from the start by the amount of metal salt added. Corrections in the course of the coating process and in particular accurate end point determination as in the process of DE Patent No. 2,522,572 are not possible.

However, it has been found, surprisingly, that it is not even possible to combine the tin dioxide precipitation as described in DE Patent No. 2,214,545 with the titanium dioxide precipitation as described in DE Patent No. 2,522,572. Evidently, the tin salt remaining in solution interferes with the titanium dioxide precipitation to such an extent as to produce only qualitatively very poor pigments whose rutile content is a non-reproducible 100%.

SUMMARY OF THE INVENTION

It is therefore an object of the present invention to find a process by means of which a titanium dioxide coating can be reliably deposited in the rutile modification on mica platelets, which is very simple to carry out in industry, in which the titanium dioxide coating can be effected by simultaneously metering in titanium salt and base, and in which the tin content can be restricted to values below 1% by weight.

Upon further study of the specification and appended claims, further objects and advantages of this invention will become apparent to those skilled in the art.

It has now been found that these objects can be achieved if first a homogeneous coating of the mica with tin dioxide is carried out in such a way that ideally no tin salt remains in solution and only then the titanium dioxide layer is precipitated.

The present invention accordingly provides a process for preparing pearl luster pigments based on metal oxide coated mica flakes wherein, to coat with titanium dioxide in the rutile form not only titanium dioxide but also tin dioxide is precipitated from aqueous metal salt solutions onto the mica flakes in aqueous suspension and the pigment is then washed, dried and calcined, which is characterized in that the precipitation of the tin dioxide is concluded before the addition of the titanium salt solution.

DETAILED DESCRIPTION

Surprisingly, this process gives a 100% rutilization in a very reliable manner even in the case of thick titanium dioxide layers even though only small amounts of tin need to be used. For instance, even an amount of about 0.25% by weight is sufficient. It is only to be on the safe side that in general a somewhat higher tin content of about 1% is preferred. However, these values are based on the weight of the mica used, so that the values based on the end product are still appreciably lower, depending on the amount of titanium dioxide precipitated on. It is also surprising that the amount of tin dioxide required for the process of rutilization is substantially independent of the particle size of the mica used.

To precipitate the tin dioxide, the mica suspension is brought to a suitable pH. In general, a suitable pH range is from about 0.5 to 3, in particular from about 1.0 to 2.5. For the purposes of the present invention, the range from about 1.5 to 2.0 has been found to be particularly advantageous. Thereafter the tin salt solution is metered in together with a base, preferably at a temperature of about 50° C. to about 100° C.

The tin salt used can in principle be any available divalent or tetravalent tin salt. On account of the easy accessibility and the low cost, it is preferable to use $SnCl_4$, the pentahydrate producing particularly good coatings. The base with which the pH of the suspension is maintained substantially constant during the coating step is freely choosable in principle, so that for example alkali metal hydroxide solutions, in particular diluted sodium hydroxide solution, ammonium hydroxide or gaseous $NH_3$ or, if desired, even conventional buffer systems can be used, the contents of which can be easily determined by one of ordinary skill in the art.

Other parameters of the tin dioxide precipitation, e.g. time, temperature and concentration of solutions, are wholly conventional as disclosed in U.S. Pat. No. 4,040,859. By following the above mentioned process parameters a substantially complete precipitation of tin dioxide is reached, substantially complete meaning that only such minor amounts of tin salts remain in solution which don't negatively influence the following precipitation of titanium dioxide.

After the precipitation of tin dioxide has ended, the mixture is generally stirred for some minutes to ensure that all the tin has been precipitated, and then the process of titanium dioxide precipitation is started. This process is in principle carried out essentially conventionally, except as noted below, in the manner described in DE Patent No. 2,009,566, where a titanium salt, in particular $TiCl_4$, is metered together with a base into the mica suspension at elevated temperatures. Surprisingly, however, it has been found that reliable rutile formation is easily achievable if the pH during the precipitation is not substantially above 2.0. Preferred pH values which are within the same range as in the tin dioxide precipitation process, namely about 1.5 to 2.0.

The coated mica pigments are then worked up in a conventional manner in that the pigment is separated off, washed, dried and then calcined. It has been found to be an advantage with the novel process that 100% rutilization is obtainable even under relatively mild calcination conditions. For instance, an approximately 30-minute calcination at about 850° C. or an equivalent time/temperature combination is sufficient. Compared with the prior art processes, where a time/temperature combination of 30 minutes/950° C. is customary, this further serves to keep the process simple and economical. Suitable equivalent time/temperature combinations may be determined conventionally according to known principles.

It has already been mentioned that using the process according to the invention even thick titanium dioxide layers can be reliably obtained in the rutile form without incorporation of tin dioxide in the layer or as an intermediate layer. In the Examples below, this is illustrated by reference to pigments having a green interference color, since they have a particularly thick titanium dioxide layer. However, since the titanium dioxide precipitation process can be stopped according to conventional processes at any desired color end point and at any desired layer thickness, the process described makes it possible to prepare any desired pigment with $TiO^2$-layers of a thickness of up to 200 nm being reliably in the rutile modification As a rule the pigments possess diameters of 1-200 $\mu m$ and thicknesses of about 0.1-5 $\mu m$, diameters of about 5-60 $\mu m$ and thicknesses of about 0.5 $\mu m$ being preferred, and can be used in all conventional applications.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

EXAMPLES

EXAMPLE 1

To a suspension of 100 g of mica of a particle size of 10 to 50 $\mu m$ in 2 l of water are added at 75° C. in the course of one hour 60 ml of an aqueous solution of 3 g of $SnCl_4 \times 5$ $H_2O$ and 10 ml of concentrated hydrochloric acid while a pH of 1.8 is maintained by the simultaneous addition of dilute sodium hydroxide solution.

An aqueous, approximately 20% strength by weight $TiCl_4$ solution is then added at a rate of about 2 ml/min while a pH of 1.6 is maintained with dilute sodium hydroxide solution. After a green interference color has been obtained, stirring is continued for approximately a further half hour, and the pigment is separated off, washed with water until salt-free, dried and calcined at 850° C. for 30 minutes. X-ray structure analysis shows that the titanium dioxide layer is 100% in the rutile form.

EXAMPLES 2 to 4

Example 1 is repeated, except that the titanium dioxide precipitation process is carried out at pH 1.8, pH 2.0 and pH 2.2 respectively. X-ray structure analysis shows that 100% rutilization is obtained.

EXAMPLES 5 to 7

Example 1 is repeated, except that the temperature of the suspension is 90° C. and the titanium dioxide precipitation process is carried out at pH 1.6, pH 1.8 and pH 2.0 respectively. X-ray structure analysis shows that 100% rutilization is obtained.

The pigments of Examples 1–7 have a composition conforming to 39.5% by weight of mica, 60.0% by weight of $TiO_2$ and 0.5% by weight of $SnO_2$.

EXAMPLE 8

Example 1 is repeated, except that the amount of tin salt is reduced to 1.5 g of $SnCl_4 \times 5$ $H_2O$. The result obtained is a pigment of composition of 39.6% by weight of mica, 60.1% by weight of $TiO_2$ and 0.25% by weight of $SnO_2$. X-ray analysis shows that 100% rutilization is obtained.

What is claimed is:

1. A process for the preparation of metal oxide coated mica flake pearl luster pigments, comprising precipitating onto a mica flake in aqueous suspension a layer of tin dioxide and a layer of titanium dioxide, wherein the precipitation of the tin dioxide is substantially concluded before the precipitation of the titanium dioxide is begun.

2. A process according to claim 1, wherein the tin dioxide is precipitated from an aqueous solution of a divalent or tetravalent tin salt and the titanium dioxide is precipitated from an aqueous solution of $TiCl_4$.

3. A process according to claim 2, wherein the tin salt is $SnCl_4$.

4. A process according to claim 3, wherein the tin salt is $SnCl_4.5H_2O$.

5. A process according to claim 1, wherein the tin salt is used in such an amount that the tin content of the pigment, based on the mica used, is about 0.25 to 1.0% by weight.

6. A process according to claim 1, wherein the tin dioxide is precipitated at a pH of about 1.5 to 2.0.

7. A process according to claim 6, wherein the titanium dioxide is precipitated at a ph of about 1.5 to 2.0.

8. A process according to claim 1, wherein the precipitation of the metal oxides is carried out at a temperature of about 50° to about 100° C.

9. A process according to claim 1, wherein the pigment is calcined at about 850° C. for at least thirty minutes or under conditions equivalent thereto.

* * * * *

UNITED STATES PATENT AND TRADEMARK OFFICE
CERTIFICATE OF CORRECTION

PATENT NO. : 4,867,794

DATED : September 19, 1989

INVENTOR(S) : KLAUS AMBROSIUS ET AL

It is certified that error appears in the above-identified patent and that said Letters Patent is hereby corrected as shown below:

Column 4, claim 1, line 45:

reads "begun."

should read -- begun and is effected by adding a tin salt solution to an aqueous mica suspension at elevated temperature while simultaneously adding a base, so as to maintain a pH at which the tin is quantitatively precipitated as tin dioxide or tin dioxide hydrate on the mica.

Signed and Sealed this

Fourth Day of September, 1990

*Attest:*

HARRY F. MANBECK, JR.

*Attesting Officer*   *Commissioner of Patents and Trademarks*